Patented Dec. 26, 1933

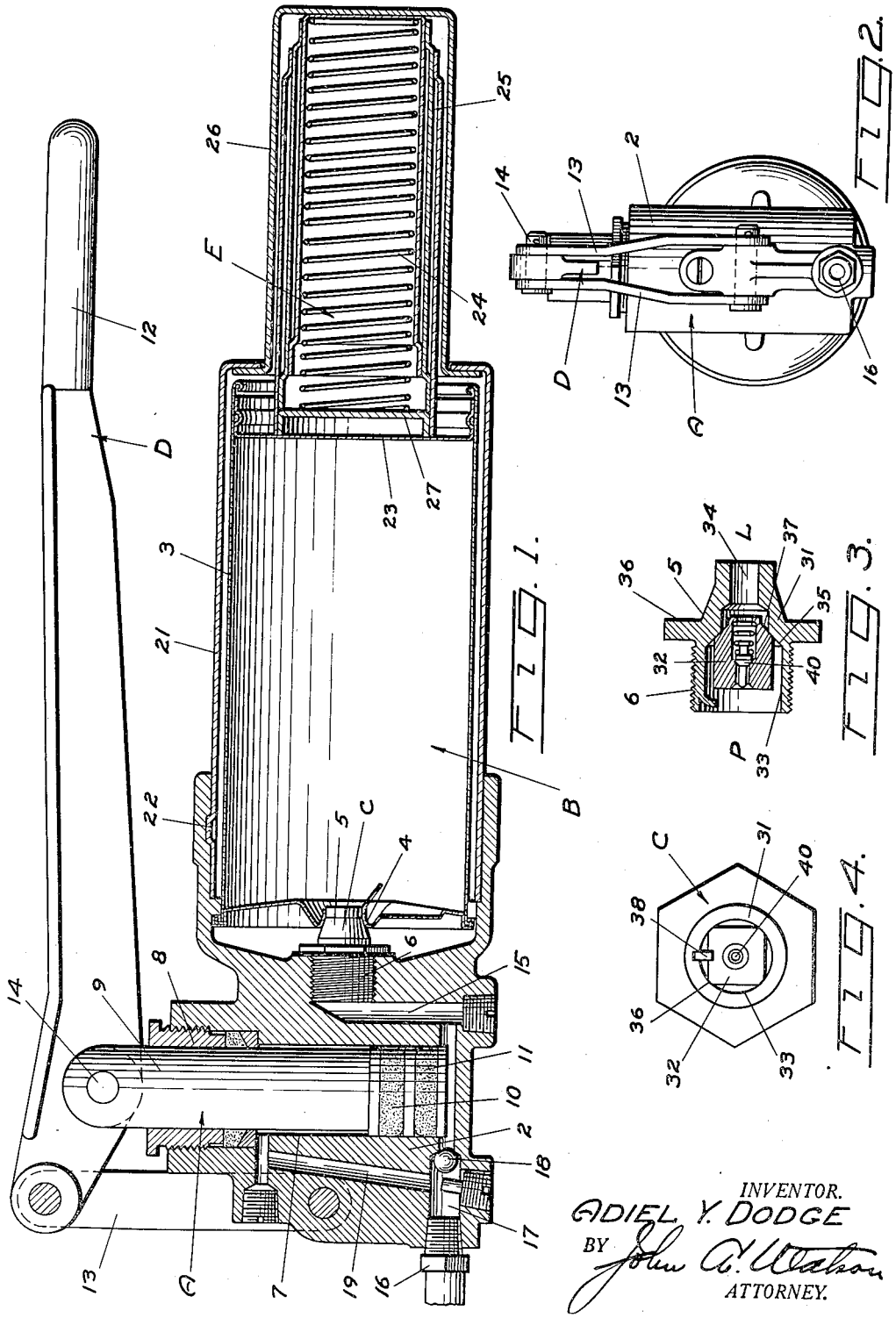

1,941,140

UNITED STATES PATENT OFFICE 1,941,140

LUBRICATION DEVICE

Adiel Y. Dodge, South Bend, Ind., assignor to The Lubrication Corporation, South Bend, Ind., a corporation of Delaware Application March 25, 1932. Serial No. 601,129

17 Claims. (Cl. 221—47.3)

This invention relates to lubrication devices nd more particularly to lubricant feeder apparatus capable of feeding lubricant, in relatively large quantities under relatively low pressure and of feeding relatively small quantities of lubricant under relatively high pressure.

In the operation of lubricant feeder apparatus or guns adapted to service bearings through lubrication nipples or fittings, relatively low lubricant pressure is normally adequate to service the bearing. However, bearings are sometimes encountered which require relatively high pressure for the reason that the lubricant has become so hardened therein that it is impossible to force lubricant through under relatively low pressure. Lubricant guns designed to provide lubricant under high pressure only, commonly sacrifice volume whereby much needless time is consumed in servicing the average bearing.

An object of my invention is to provide an improved high and low pressure lubricant feeding apparatus, or gun, possessing the combined advantages of the high pressure gun and the low pressure gun, the features of which may be embodied in a hand operated apparatus or in a power operated apparatus.

Another object is to provide a lubricant feeder or gun including a feeder pump wherein lubricant under maximum low pressure is delivered during one cycle of pump operation and lubricant under high pressure is delivered during the remaining cycle of pump operation.

Another object is to provide a lubricant gun, including a lubricant feeder pump from which lubricant, when under greater than a predetermined maximum pressure, may be delivered back to the lubricant supply or source during the low pressure cycle of the pump operation.

A further object is to provide a lubricant gun of the lever type wherein a casing for confining the source of lubricant supply therefor, is formed with a reduced portion having functional purposes in connection with the source of lubricant supply and also serving as a hand grip during the use of the gun as in manipulating the gun lever.

Other objects, the advantages, and the uses of the invention will be, or should become apparent after reading the following description and claims and after consideration of the accompanying drawing wherein:

Fig. 1 is a sectional view illustrating a gun constructed in accordance with my invention;

Fig. 2 is an end elevation of the gun illustrated in Fig. 1.

Fig. 3 is a view in vertical section illustrating a valve employed in the gun; and Fig. 4 is a rear elevation of the valve shown in Fig. 3.

In general, the lubricant gun selected for illustration herein is of the hand lever type designed for hand operation, comprising a lubricant pump A, adapted to deliver lubricant under low pressure in relatively large quantities during one cycle of its operation and to deliver lubricant under high pressure in relatively small quantities during the opposite cycle of operation, a source of lubricant supply B and a valve C for establishing communication between the pump A and a source of lubricant supply B to permit unretarded flow of lubricant to the pump and to permit the return of lubricant from the pump under pressures exceeding a predetermined minimum value. The latter function is effective only during the low pressure cycle of pump operation as hereinafter explained. The remaining elements of the gun comprise a hand lever D for operating the pump A and a spring pressure piston assembly E for maintaining the lubricant in the supply source B under slight pressure.

Referring particularly to Fig. 1 it will be seen that the pump A comprises a body 2 upon which a lubricant cartridge 3 comprising the source of lubricant supply B, is detachably secured by bayonet lock of conventional structure. The cartridge 3 has an outlet opening the wall 4 of which is fashioned to conform with the external surface 5 of the outer end of the valve C. The valve C is secured to the body 2 by introducing an externally threaded shank portion 6 into an internally threaded recess in the body 2, centrally aligned with the cartridge 3 when the cartridge is in place. The contacting surfaces of the outlet wall 4 and the outer wall 5 of the valve C, in the present instance, is shown as defined by the frustum of a cone, whereby a wedge like action between the cartridge outlet wall and the valve body is established by longitudinal thrust of the cartridge outlet orifice against the valve body, to establish a lubricant tight seal therebetween. Obviously, the surface 5 of the valve, and the wall 4 of the cartridge outlet opening may possess other and complementary contour, as for instance spherical contour, and still retain the advantages of lubricant tight interconnection under relative longitudinal thrust. The valve C positioned, as shown, is therefore directly associated with the lubricant cartridge 3 so as to control the flow of lubricant in either direction through the outlet orifice thereof.

The pump A comprises a pressure cylinder 7 formed by providing a vertical bore partially through the body 2, which is closed at its upper end by a packing ring assembly 8 through which a piston rod 9 of relatively large diameter extends. The piston assembly is positioned at the lower end of the piston rod 9 and includes a pair of cup shaped packing members 10 and 11, having their side walls extending away from one another, so that pressure may be built up on either side of the piston depending upon the direction of piston travel.

The cylinder 7 of the pump is thus divided into two pressure chambers, the chamber above the piston having an effective piston displacement less than that chamber beneath the piston an amount equal to the displacement of the relatively thick piston rod 9. The chambers therefor comprise a high pressure chamber of relatively small piston displacement and a low pressure chamber of relatively large piston displacement.

The hand lever D is pivotally connected at one end with a pair of links 13 which, in turn, are pivotally mounted on the body 2 and the piston rod 9 is pivotally connected to the lever D at a short distance from its pivotal connection with the links 13, whereby relatively high pressure may be transmitted to the piston by hand operation of the lever D applied to the hand grip 12 thereof.

The lower end of the cylinder 7 communicates with the valve C by means of a passage 15 and with a discharge stud 16 through a passage 17, in which a ball valve 18 is disposed to prevent return flow of lubricant to the cylinder or low pressure chamber beneath the piston from the passage 17 and parts associated therewith.

The discharge stud 16 is adapted for direct communication with a lubricant discharge nozzle (not shown) which may be employed for connecting the gun with a lubricant nipple or fitting; or a flexible hose may be connected to the stud having a discharge nozzle disposed at its outer end.

The passage 17 communicates with the cylinder 7 above the piston 10—11 by means of a passage 19 so that pressure produced by the downward movement of the piston will not only force lubricant out through the discharge stud 16 under relatively low pressure but will also urge lubricant into the cylinder or high pressure chamber above the piston to fill that space about the relatively large piston rod 9.

The lubricant gun further comprises a casing 21 for housing the cartridge 3 which is detachably secured to that portion of the body 2, to which the cartridge 3 is detachably secured by bayonet lock structure 22 of the type in common use in casings and containers having separable parts.

A piston 22 is disposed within the cartridge 3 which is urged yieldingly against the lubricant in the cartridge by a compression spring 24 disposed within a telescopic tubular assembly 25. The assembly 25 comprises three tubes one telescoping over the other for limited movement as when extended, which serves to confine the spring 24 and to prevent the lateral displacement of the spring as when the spring is compressed. One end of the spring assembly E, thus formed, bears against the rear wall of a rearwardly extending reduced portion 26 of the casing 21 and at its other end, against a bracket 27 contacting with the rear face of the piston. The lubricant in the cartridge 3 is thus maintained under slight pressure so that it may be more readily withdrawn by action of the pump A.

With reference to Fig. 1 it will be seen that the reduced portion 26 of the casing 21 is of such size and so positioned with respect to the lever D that it serves as a hand grip for use during operation of the gun to provide convenient manual actuation of the parts by relative movement between the lever D and the body 2 of the gun.

In Figs. 3 and 4 I have illustrated the valve C in detail and employed the letters P and L to designate the pump and lubricant sides respectively thereof. The valve comprises two major parts, an outer member 31 upon which the external threads 6 and the cartridge contacting surface 5 are formed and an internal and independently operative assembly 32.

The member 31 has a relatively large cylindrical bore 33 on the pump side which communicates with a bore 34 on the lubricant side through a portion forming a conical valve seat 35. A flange 36 having hexagonal side walls is formed on the outer wall of the member 31 intermediate the threaded shank 6 and the surface 5 for the purpose of engagement with a wrench or similar tool as in screwing the valve in place during installation.

The internal assembly 32 comprises a body which is substantially square in cross section with its corners 36 slightly rounded and contacting with the walls of the bore 33 so that clearance between the assembly and the wall of the bore 33 is maintained on its four sides to permit the passage of lubricant through the bore. That end of the assembly 32 opposed to the conical seat 35 is formed with a similarly contoured conical surface 37 so as to form a lubricant tight closure between the bore 33 and the passage 34 when pressure is exerted upon the pump side of the valve. An inward and radially extending projection 38 is provided on the wall of the bore 33 to limit the rearward movement of the assembly 32 as when lubricant is passing from the lubricant side to the pump side of the valve.

The assembly 32 has a spring pressed valve 40 disposed therein, the strength of the spring being so adjusted as to permit the opening of the valve under pressures exceeding a predetermined value. The valve 40 is adapted to open only to permit the passage of lubricant from the pump side to the lubricant side of the valve, i. e. in that direction opposite to the flow through the valve structure formed by the member 31 and the assembly 32.

In practice the strength of the spring of the valve 40 is determined by the maximum amount of manual effort determined as proper for operating the lever D during the down stroke of the piston 10—11. Thus if a lubricant fitting is encountered wherein the resistance to the passage of lubricant therethrough is sufficiently great as to require pressure in the pump A beyond the limits convenient for operation of the pump by movement of the lever, the valve 40 will open to permit the down stroke of the piston 10—11 so that the succeeding up stroke may be employed to force lubricant under the high pressure required through the fitting or nipple.

Under ordinary conditions, however, the pressure created during the down stroke of the piston 10—11 by lever operation is sufficient to pass lubricant through the fitting or nipple and into the parts to be lubricated and the discharge of relatively large quantities of lubricant on down stroke piston movement is available. In the latter instance the up stroke movement of the piston while only discharging lubricant (in relatively small quantities) nevertheless adds to the useful servicing of the fitting by lubricant discharge thereto.

At all times during the up stroke of the piston 10—11 the ball valve 18 is closed so as to prevent the bypassing of lubricant under high pressure chamber above piston to the low pressure chamber below the piston and also to create a differential in pressure between the low pressure chamber and the lubricant supply source B to induce the passage of lubricant unretardedly through the valve C into the cylinder 7.

It is to be understood that the embodiments of the invention herein set forth are presented for the purpose of illustration only, and various changes may be made without departing from the spirit of the invention and the scope of the appended claims.

I claim:

1. In a lubricant feeder pump lubricant pressure producing means having an intake and a discharge opening, a reservoir associated with said pressure producing means for supplying lubricant thereto through said intake, said pressure producing means being arranged to discharge lubricant under pressure through said discharge opening and means in said intake and effective during the operation of said pressure producing means when excessive resistance to the discharge lubricant is encountered to return lubricant to said reservoir.

2. In a lubricant feeder pump, a piston, means for causing said piston to reciprocate in a two stroke cycle, and means, including said piston and said reciprocating means, for causing lubricant to be discharged from said pump in relatively large quantities and under relatively low pressure and below a predetermined maximum pressure on one stroke of said cycle, and for causing lubricant to be discharged from said pump under relatively high pressure throughout the entire other stroke of said cycle.

3. In a lubricant feeder pump, a piston, a lever for moving said piston in one direction when the lever is moved away from the pump and for moving the piston in the opposite direction when the lever is moved toward the pump, means including said piston, effective when the lever is moved in one direction, for discharging lubricant from said pump under relatively low pressure, means including said piston, effective when the lever is moved in the opposite direction and throughout the entire piston stroke, for discharging lubricant from the pump under relatively high pressure, and means for limiting the pressure produced during the said low pressure stroke.

4. In a lubricant feeder pump having a discharge outlet, a pressure cylinder of uniform internal diameter, a piston mounted for reciprocation in said cylinder dividing said cylinder into a pair of chambers, a piston rod of relatively large diameter secured to the piston on one side thereof and extending exteriorly of said cylinder whereby the effective piston displacement in one of said chambers is greater than that of the other, means forming a passage interconnecting said chambers and said discharge outlet, a check valve in said passage for preventing the return flow of lubricant from said passage into the chamber of greater piston displacement, and means for limiting the pressure produced by piston movement in said last named chamber.

5. In a lubricant feeder pump having a discharge outlet, a pressure cylinder of uniform internal diameter, a piston mounted for reciprocation in said cylinder dividing said cylinder into a pair of chambers, a piston rod of relatively large diameter secured to the piston on one side thereof and extending exteriorly of said cylinder whereby the effective piston displacement in one of said chambers is greater than that of the other, means forming a passage interconnecting said chambers and said discharge outlet, a check valve in said passage for preventing the return flow of lubricant from said passage into said chamber of greater piston displacement, and means for limiting the pressure produced by piston movement in said last named chamber.

6. In a lubricant feeder pump having a discharge outlet, a pressure cylinder of uniform internal diameter, a piston mounted for reciprocation in said cylinder dividing said cylinder into a pair of chambers, a piston rod of relatively large diameter secured to the piston and extending exteriorly of said cylinder whereby the effective piston displacement in one of said chambers represents the maximum displacement of said piston whereas the displacement in the other chamber is reduced, said pump having a passage interconnecting its discharge outlet with the chamber of greater piston displacement, a check valve in said passage to prevent the return flow of lubricant to said chamber, said passage between said check valve and said discharge outlet communicating with said chamber of lesser piston displacement, and means for limiting the pressure produced by piston movement in said chamber of greater piston displacement.

7. In a lubricant feeder apparatus, a pump comprising a cylinder of uniform internal diameter, a piston disposed in said cylinder adapted to reciprocate throughout substantially the entire length of said cylinder, a piston rod of relatively large diameter secured to said piston and extending exteriorly of the cylinder whereby a pressure chamber of relatively small piston displacement is provided on one side of the piston and a chamber of maximum piston displacement is provided on the opposite side of the piston, means for admitting lubricant to both of said chambers, a discharge outlet for said pump communicating with both of said chambers and means for permitting the return of lubricant from said chamber of greater piston displacement under a predetermined minimum pressure and means for preventing the return of lubricant from said chamber of lesser piston displacement.

8. In a lubricant feeder pump comprising a cylinder of uniform internal diameter, a piston mounted for reciprocation in said cylinder for maximum piston displacement when the piston is moved in one direction, a discharge outlet for the pump, said pump having a passage therethrough establishing communication between those portions of said cylinder on opposite sides of said piston and with said outlet, a check valve for preventing the flow of lubricant from the cylinder at one side of said piston to the cylinder on the opposite side of said piston in one direction, means for admitting lubricant to said cylinder on both sides of said piston as the piston is reciprocating, said last named means including said check valve, and means for permitting the egress of lubricant through other than said discharge outlet from said cylinder on one side of said piston at all pressures greater than a predetermined minimum pressure.

9. In a lubricant feeder pump, a cylinder, a piston mounted for reciprocation in said cylinder, a piston rod for said piston extending exteriorly of said cylinder, packing surrounding said piston rod for closing the end of said cylinder, a source of lubricant supply, means forming a passage between said lubricant source and the cylinder positioned, with respect to said cylinder, with the mouth of the passage beyond the limits of piston travel, a lubricant discharge outlet communicating with said cylinder on opposite sides of said piston, and a check valve for preventing return flow of lubricant from said discharge outlet to at least one end of said cylinder.

10. In a lubricant feeder pump, reciprocating means for producing pressure in a two stroke cycle throughout the entire stroke in each cycle, the displacement of the pressure producing parts being greater on one stroke of said cycle than on the other, a source of lubricant supply, means for admitting lubricant from said source to said pressure producing parts and means for permitting the return flow of lubricant to said source during the pressure stroke of greater displacement at all pressure exceeding a predetermined minimum value.

11. In a lubricant feeder pump, a pressure cylinder of uniform diameter throughout its length, a piston mounted for reciprocation in said cylinder, said piston being so constructed as to provide its maximum displacement within said cylinder on one side and a lesser displacement on its other side, a discharge outlet communicating with that portion of said cylinder having the lesser piston displacement, and means for establishing communication in one direction between said discharge outlet and that portion of said cylinder having the greater piston displacement.

12. In a lubricant feeder pump, a pressure cylinder, a piston mounted for reciprocation in said cylinder thereby dividing said cylinder into two pressure chambers, a discharge outlet for said pump communicating at all times with both of said chambers, a source of lubricant supply and means including a valve adapted to open at a predetermined pressure for establishing potential communication between one of said chambers and said source of supply irrespective of the position of said piston in said cylinder.

13. In a lubricant feeder apparatus, a pump for discharging lubricant under pressure, a cylindrical lubricant reservoir, a piston in said reservoir, a spring for applying longitudinal thrust to said piston and a telescopic tubular casing surrounding said spring for confining the spring against lateral displacement and to limit the extendability of the spring.

14. In a lubricant feeder pump, a casing, a lubricant cartridge disposed within said casing for providing a source of lubricant supply for said pump, a piston in said cartridge arranged to bear against the lubricant therein, and mechanical pressure producing means for urging said cartridge piston inwardly of the cartridge, said casing having a longitudinally extending reduced portion at one end for confining said pressure producing means.

15. In a lubricant feeder pump, a cylinder having an intake, a discharge piston in said cylinder, a lever for reciprocating said piston in a two stroke cycle, a reservoir associated with said cylinder for supplying lubricant thereto through said intake said piston being responsive to movement of said lever in one direction for discharging lubricant under pressure, and means in said intake and effective upon said lever movement, when excessive resistance to the discharge of lubricant is encountered, for returning lubricant to said reservoir.

16. In a lubricant feeder pump, a cylinder having an intake and a discharge, a piston in said cylinder means for reciprocating said piston, a reservoir associated with said cylinder for supplying lubricant thereto through said intake, said piston being responsive to said reciprocating means for delivering lubricant under pressure through said discharge and means in said intake and effective upon operation of said piston reciprocating means, when excessive resistance is encountered, for returning lubricant to said reservoir.

17. In a lubricant feeder pump, a cylinder, a piston mounted for reciprocation in said cylinder, a piston rod for said piston extending exteriorly of said cylinder, packing surrounding said piston rod for closing the end of said cylinder, a source of lubricant supply, means establishing unrestricted flow of lubricant from said source of supply to said cylinder beyond the limits of piston travel in the cylinder and for establishing a return flow of lubricant from said cylinder to said source of supply at pressures exceeding a predetermined maximum pressure, a lubricant discharge outlet communicating with said cylinder on opposite sides of said piston, and a check valve for preventing return flow of lubricant from said discharge outlet to at least one end of said cylinder.

ADIEL Y. DODGE.